United States Patent [19]
Shafer et al.

[11] Patent Number: 5,572,338
[45] Date of Patent: Nov. 5, 1996

[54] IMAGE SCANNING DEVICE HAVING DIRECTION-RESPONSIVE PROGRAMMABLE DELAY MECHANISM

[75] Inventors: Mark E. Shafer, Fairport; Lawrence E. Walther, Macedon, both of N.Y.

[73] Assignee: Eastman Kodak Company, Rochester, N.Y.

[21] Appl. No.: 326,162

[22] Filed: Oct. 18, 1994

Related U.S. Application Data

[63] Continuation of Ser. No. 943,421, Sep. 14, 1992.
[51] Int. Cl.⁶ .............................. H04N 1/04; H04N 1/40
[52] U.S. Cl. .......................... 358/474; 358/443; 358/486; 358/497
[58] Field of Search ...................................... 358/400, 500, 358/474, 448, 482, 527, 529, 447, 451, 443, 497, 486; 382/54

[56] References Cited

U.S. PATENT DOCUMENTS

| | | | |
|---|---|---|---|
| 4,891,690 | 1/1990 | Hasegawa et al. | 358/443 |
| 4,999,717 | 3/1991 | Nagashima | 358/448 |
| 5,057,942 | 10/1991 | Kanehl et al. | 358/490 |

*Primary Examiner*—Edward L. Coles, Sr.
*Assistant Examiner*—Allan A. Esposo
*Attorney, Agent, or Firm*—Charles E. Wands

[57] ABSTRACT

A scanner control circuit comprises a digital line delay memory and a control circuit coupled to the digital line delay memory. The control circuit receives digital multi-channel image data having a channel-to-channel delay and corrects for said channel-to-channel delay. Each channel's image data is written into the digital line delay memory at an address in the digital line delay memory corresponding to the correct line number and is then read out of the digital line delay memory for processing. The scanner control circuit operates to allow scanning of an object bi-directionally.

12 Claims, 3 Drawing Sheets

IMAGE SCANNING DEVICE HAVING DIRECTION-RESPONSIVE PROGRAMMABLE DELAY MECHANISM

This is a Continuation of U.S. application Ser. No. 943,421, filed 14 Sep. 1992.

TECHNICAL FIELD

The present invention relates to a scanner control circuit and, more particularly, to a scanner control circuit which corrects for color channel spatial, i.e. line, delay in the digital image of an object such as a document or film that is scanned using a detector.

BACKGROUND ART

It is known to use linear charged coupled devices (CCDs) to scan colored objects such as documents or film. The CCD can be used in either focal plane or contact optical configurations, and in reflection or transmission modes of operation. The video line-scan signal of the CCD when measured produces the pixels of the digital image in one dimension (referred to as the "line-scan"). Through relative motion of the object-to-CCD perpendicular to the line-scan direction, multiple lines are allowed to be measured. This produces the pixels in the page-scan direction.

In order to scan several objects automatically, many scanners are known that utilize one mechanism to advance and position the next object to be scanned, and a second mechanism to produce the page-scan motion with respect to the CCD detector. In these known scanners, the page-scan mechanism must reciprocate, i.e. it may scan in a left to right or clockwise direction and then retrace its motion to prepare for the next scan. The requisite retracing of the page-scan mechanism is of no use to the scanning operation and slows down the scanning process.

Other known scanners use only a single mechanism to produce both the page-scan motion and the advance to the next object in order to scan several objects automatically. For such scanners with continuous feed of the object, for example, a capstan film drive or pinch rollers through which are moved individual document pages, the scanning motion for the next object can begin as soon as that object is moved into position. Such a system provides little wasted motion. However, if one wishes to preview scan before performing the full scan, e.g. perform a low resolution scan first and then a high resolution scan, the object must be rewound or repositioned to perform the second scan. Again, this slows down the scanning process.

The ability to provide low or "reduced" resolution scanning is available in many known commercial scanners. Fundamentally, it is performed through a resampling of the digital data. For example, in several desktop scanners that are currently available, it is a common practice although somewhat crude, to average groups of "n" pixels in the line-scan direction, thus leaving (1/n)x fewer pixels per line. In the page-scan direction, the sampling pitch, i.e. the distance between successive line measurements, is then increased. Such a simple pixel-summing method is well known to those having ordinary skill in the art.

In order to allow a multi-channel image, such as a color representation, to be digitized in a single pass of the scanner, tri-linear CCDs have been used to scan the object. A tri-linear CCD has three physically separate, parallel and equally spaced linear arrays of photosites integrated onto a single device such as a silicon chip. However, because each of the three linear arrays are distinct from one another and therefore cannot be arranged coincident with each other, the separation between the line arrays results in channel-to-channel spatial delay of the received image data in the page-scan direction.

In order to simplify the processing of the received image data, the channel-to-channel spacing is designed to be an integer number, N, times the line-scan pitch, $P_1$, i.e. the distance between the photosites along the linear array. By restricting the product of the page-scan sampling pitch, $P_p$, times an integer number M, to be equal to the original channel-to-channel distances:

$$P_p \cdot_{M=P1 \cdot N \, for} M=N, N-1, N-2, \ldots 2, 1.$$

the channel-to-channel spatial delay introduced will be an integer "line" amount of the value M, and is therefore easily removed during processing.

Also, the channel-to-channel spacings are designed in a tri-linear CCD to be equal. For example, for a red- green- blue (RGB) tri-linear CCD, the spacing between the red array and the green array, i.e. the red to green line delay, is equal to the spacing between the green array and the blue array i.e. the green to blue line delay, and is twice that of the red-to-blue spacing.

Known solutions to "re-align" the image data from each linear array in a tri-linear CCD have attempted to place the image data into a buffer large enough to hold the entire image. The image data is then read out of the buffer in a line-delayed manner. Such an approach is very costly due to the fact that the buffer must be larger than necessary to remove the channel-to-channel delay. Also, the use of a large buffer is very time consuming because one must wait until the image data is aligned before it can be color processed.

The use of an analog line delay with a multi-CCD device is also known. By changing the clocking of the line delay structures, one can vary the amount of delay and the channel to which it is applied. However, such analog delays add noise and have dark signal offset voltages which will vary with delay time. This presents problems in that the calibration of the device changes with its operating mode.

In view of the deficiencies with these known scanners, there is therefore needed a scanner having a scanner control circuit which provides digital real-time spatial delay correction of tri-linear CCD scan image data to allow color bi-directional scanning with varying spatial resolutions.

SUMMARY OF THE INVENTION

The present invention meets these needs by providing a scanner control circuit for correcting color channel spatial delay in a digital image of an object scanned with a tri-linear detector, comprising a digital line delay memory, a control circuit coupled to said digital line delay memory through data and address buses, said control circuit receiving digitized color channel image data and further comprising a pixel counter providing the pixel number as part of an address to said digital line delay memory for writing/reading each line of said digitized color channel image data; a line number circuit for providing one of a current line number and a delayed line number as part of said address; and a color select signal providing the channel indication as part of said address indicating the color being written/read. The line number circuit comprises a line counter providing a current line number output; a delay register providing a delay amount output; a first adder receiving said current line output and said delay amount output and providing a first delayed line number output; a second adder receiving said first delayed line number output and said delay amount output and providing a second delayed line number output; a first multiplexer receiving said first and second delayed line number outputs and providing a first multiplexer output; and a second multiplexer receiving said current line number output and said first multiplexer output and providing said one of a current line number and a delayed line number as part of said address.

It is an advantage of the present invention to correct for color channel spatial delay when scanning an object in either direction, i.e. bi-directionally. Additionally, the present invention is designed in a manner which corrects the spatial delays when scanned at various discrete spatial resolutions in either direction.

It is another advantage of the present invention that the circuit has the ability to significantly improve the throughput of the scanner due to the bi-directional scanning. This also allows for flexible preview/scan operations. The object can be previewed in one direction and have a desired area scanned in the other direction.

Because the present invention operates digitally, it is inherently more robust than previous CCD analog line-delay methods. Further, the spatial realignment of the data in the present invention simplifies subsequent real-time digital color processing.

It is a further advantage of the present invention that the retrace motion of the known scanners having a mechanism to advance/position the next object and to produce the page scan motion is eliminated. Because the present invention produces bi-directional scanning, the retrace motion is not necessary. One effect of the bi-directional scanning is that the resulting image is flipped in the page direction. However, the reformatting necessary to restore the original image orientation is easily performed in real-time by specialized hardware (which stores the data into non-sequential memory locations), or after the scan by a general purpose computer. The flipping of an image is well known to those skilled in the art.

Through the use of the programmable digital line delay memory and control circuit of the present invention, the problems associated with the prior art devices are eliminated. Further, if the present invention is implemented in a real-time hardware solution, the buffer space necessary can be minimized, and color processing functions can be performed in real-time (matrixes, three-dimensional look-up tables, etc.) because the RGB values for a particular pixel are properly "aligned".

Further, with control of both the channels to be delayed i.e. R, G or B, and the amount of delay, the inter-channel spatial delay in the digital image's page-scan direction can be removed. Not only does this allow the object to be scanned bi-directionally, it also allows the scanning resolution, i.e., the sampling pitch, to be varied in the page-scan direction.

Other objects, advantages and novel features of the present invention will become apparent from the following detailed description of the invention when considered in conjunction with the accompanying drawings.

DESCRIPTION OF THE PREFERRED EMBODIMENTS

Figure 1:
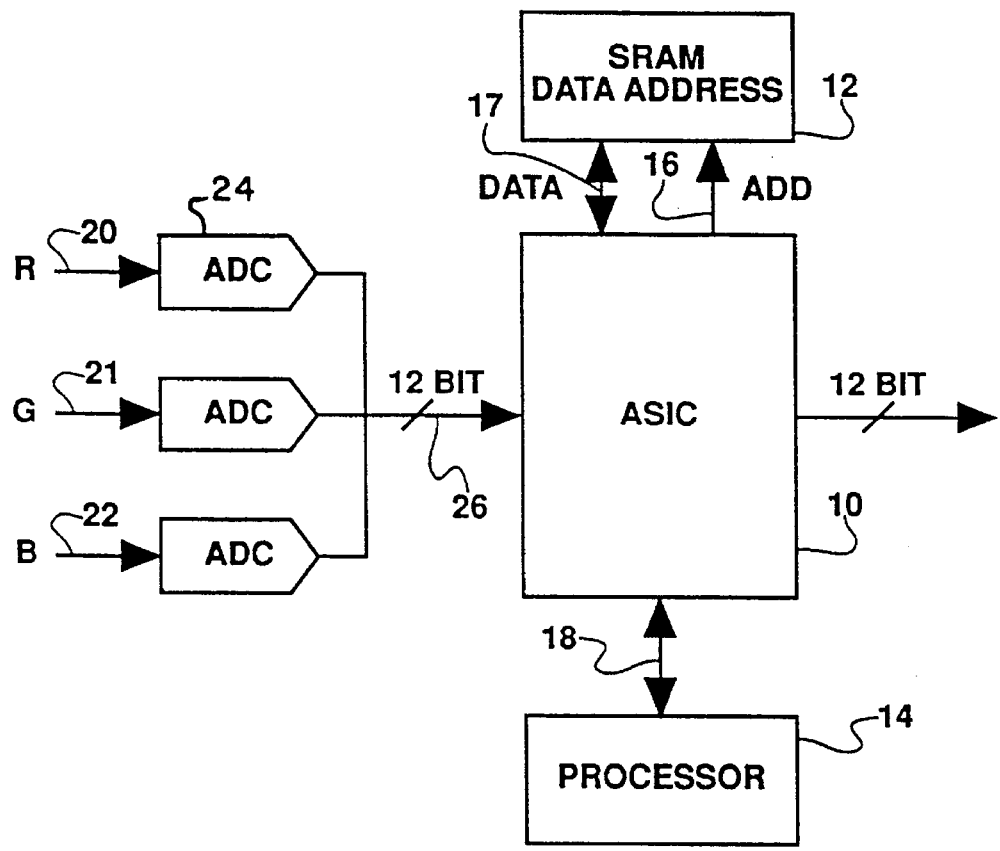
FIG. 1 is a schematic block diagram of the present invention.
Figure 2:
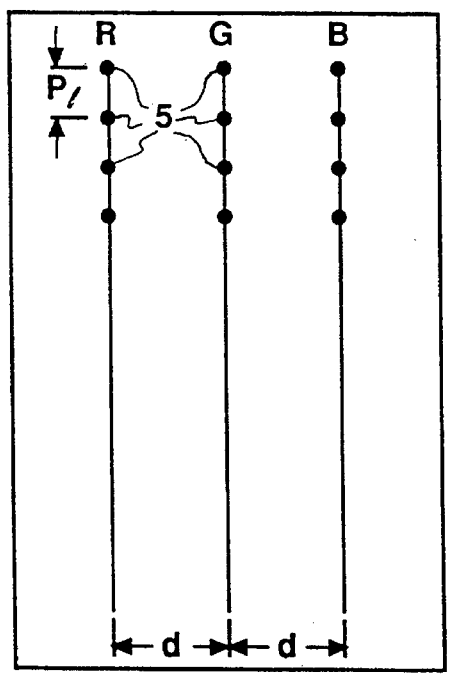
FIG. 2 is an illustration of a tri-linear CCD detector illustrating the line scan pitch and channel-to-channel spatial delay.

Referring to the schematic block diagram of FIG. 1, a gate array 10 interfaces with a memory 12 via an address bus 16 and a bi-directional SRAM data bus 17. The gate array 10 further interfaces with a micro-processor 14 over bus 18. The gate array 10, which can be for example a programmable ASIC, receives image data on bus 26 from three analog to digital converters (ADCs) 24. Each one of the three ADCs is provided to receive a separate channel of a multi-channel image, for example, red, green or blue color channels 20-22 as shown. The color channels 20-22 are produced from a multi-channel imager such as a tri-linear CCD detector shown in FIG. 2. The tri-linear CCD detector of FIG. 2 has three separate linear arrays indicated by red (R), green (G), and blue (B). The linear arrays have a channel-to-channel spacing indicated as "d". Further, each linear array is composed of a number of photosites 5 as shown. The line-scan pitch, $P_1$, is indicated as being the distance between the photosites in each linear array. For example, each linear array may consist of 2000 photosites having a separation of approximately 14 microns.

Referring back to FIG. 1, the memory 12, which for example can be a static random access memory (SRAM), is used as a digital line memory for the line delay. The ASIC 10 is interfaced to the micro-processor 14 so that control registers within the ASIC 10 can be read and/or written by the micro-processor 14. The control logic within the ASIC 10 is constructed such that one can select whether the red and green, or green and blue channels are to be delayed depending upon the direction of scanning. Preferably, the green channel delay is selectable within a range, for example, of 0 to 16 lines of delay in integer amounts. The red and blue delay is designed to be two times that of the green channel delay.

If the red channel spatially precedes, i.e. the same spot is measured before, the green channel in the scanning direction, one must delay the red and the green channels with respect to the blue channel. Conversely, when the scanning direction is reversed, the blue and green channels are delayed with respect to the red channel.

Depending on the page-scan sampling pitch, the amount of line delay is varied. For example, if the sampling pitch in the page direction is the same as the pitch along the sensor, M=N, the green channel would be delayed by a factor of N lines and the red or blue channel would be delayed by a factor of 2N lines depending upon the direction of scanning.

As also can be seen, if the resolution is halved in the line scan direction, for example by resampling such as by the pixel summing method discussed above, and the page-scan pitch is also halved then the delays are halved as well according to the equation:

$$2 \cdot P_p \cdot M = P_1 \cdot N \quad M=N/2$$

In this case, the green channel would be delayed by a factor of N/2 lines and the red or blue channel by a factor of N lines depending upon the direction of travel.

The RGB video signals 20–22 are digitized in parallel through the ADC converters 24. The video signals are then multiplexed sequentially onto the 12 bit data bus 26 and input into the ASIC 10. The image data is processed through the ASIC 10 in RGB pixel sequential order, i.e. R, G, B, R, G, B . . . . Alternately, the ASIC 10 can receive the image data in a line interleaved manner.

The ASIC 10 performs the control functions for delaying the appropriate channel in conjunction with the SRAM 12. The SRAM 12 must be of a sufficient size to hold all the pixels for the maximum number of lines that are to be delayed for each of the two possible colors, i.e. red or blue and green. In principle, if the maximum line delay needed was "D" lines, then what is required is:

D·(number of pixels per line)+D/2·(number of pixels per line).

In practice however, because standard memory chips are available in sizes that are a function of a power of two, i.e. not one and one-half, and because of the ease of design, it is preferable to use:

2·D·(number of pixels per line).

For example, with 4,096 pixels per line and a 16 line maximum delay, 128K pixel locations are required, and thus 128K SRAM memory is sufficient.

Figure 3:
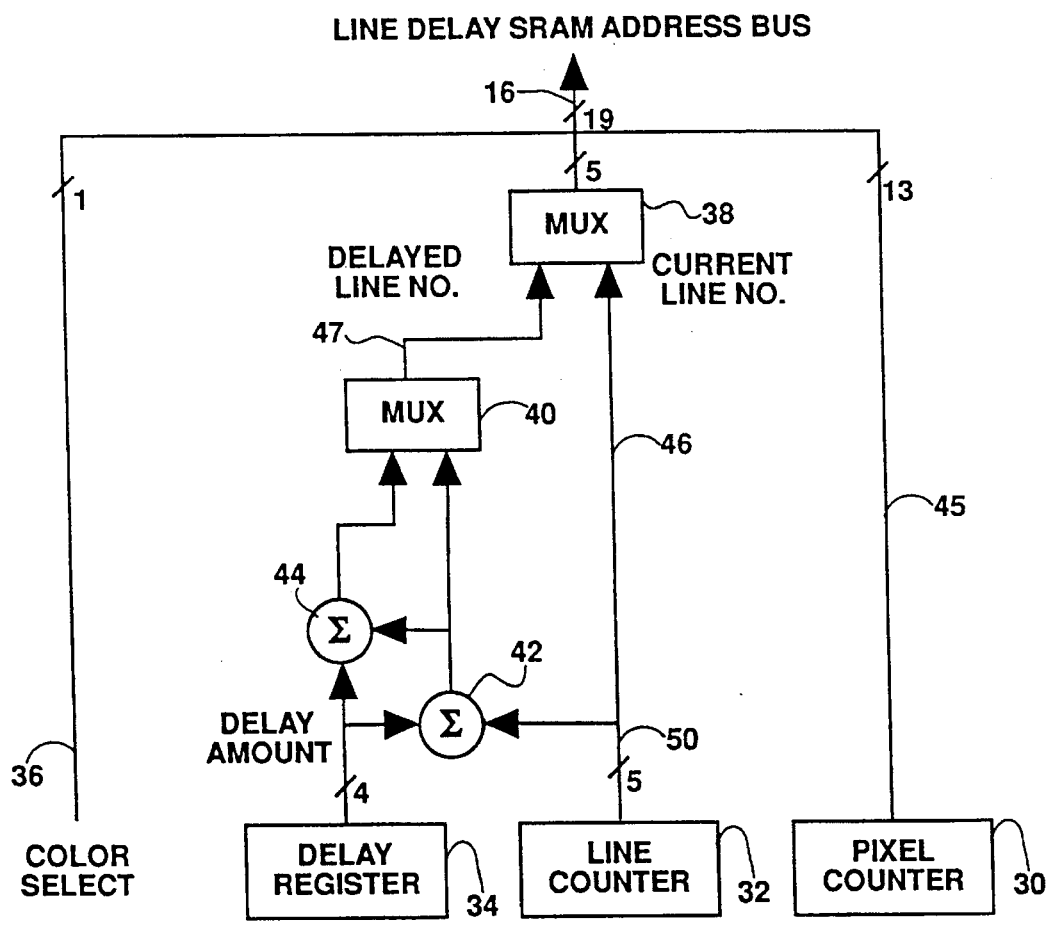
FIG. 3 is a schematic block diagram of the ASIC's control circuit for providing the line delay address of the present invention.
Figure 4:
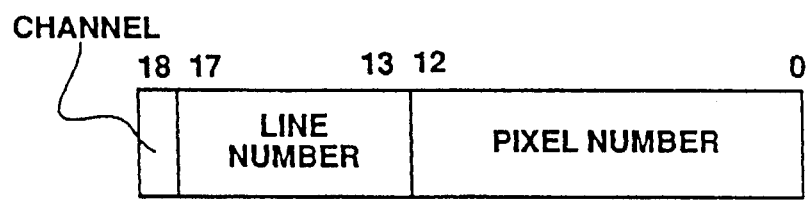
FIG. 4 shows an example of the address fields provided from the ASIC to the line delay SRAM on the address bus.

The ASIC 10 communicates with the SRAM 12 via the address bus 16. FIG. 3 is a schematic block diagram of the control circuitry in the ASIC 10 which generates the addresses output to the SRAM 12 over bus 16. The address bus 16 is constructed to keep track of the pixel, line and color information received in the ASIC 10. An example of the address fields generated by the ASIC 10 are shown in FIG. 4. The lower bits (0–12) of the SRAM address bus 16 are used to indicate the pixel number. The next higher group of bits (13–17) in the address form the line number that was scanned. One bit (18) is provided to indicate the channel, i.e., whether the ASIC 10 is reading/writing the red/blue channel or the green channel. As one example, the channel bit can be set to a true or "one" value to indicate the green channel or a false or "zero" value for the red and blue channels. The direction of the scan allows the scanner to determine if the false reading is for the red or blue channel.

Referring back to FIG. 3, there is shown a pixel counter 30, line counter 32, and a delay register 34. These counters and register along with a color select line 36 provide the line delay SRAM address output over bus 16.

The pixel counter 30 generates the pixel number which forms the lower bits of the address. The output from the pixel counter 45 can be, for example, a 13 bit output allowing the representation of 8192 pixels.

The next higher group of bits forming the SRAM address denote the line number of the scan. This line number only needs to be as large as the maximum number of lines to be delayed. For example, if a maximum 32 line delay is necessary, i.e. two times the channel-to-channel line delay, then 5 bits are required. The line count is provided by the line counter 32 and is shown having a 5 bit output. The output 50 is fed to both a multiplexer 38 and an adder 42.

A delay register 34 stores the nominal line delay amount, i.e. the channel-to-channel line delay, that is written by the micro-processor 14. The output from the delay register 34, for example, eight lines of delay, is provided to the adder 42 as well as to an adder 44. The output from adder 42 is provided to a multiplexer 40 as well as to the adder 44. The output from adder 44 is provided to the multiplexer 40. The output from the multiplexer 40 is provided on line 47 to multiplexer 38.

The line number that is output is actually one of three possible values, based on how the multiplexers 40 and 38 are controlled. In the first case, the current line count fed to multiplexer 38 on line 46 is passed through multiplexer 38 and output onto the address bus 16. The current line number is used to read back the delayed red (or blue) and green data from the SRAM.

In the second case, the current line count from line counter 32 is fed to the adder 42 which adds the delay amount stored in delay register 34. The output from adder 42 is then passed through multiplexer 40 to multiplexer 38 and output onto address bus 16. This line number is used when writing the green data "ahead" in the SRAM.

In the third case, the current line count from the line counter 32 plus two times the delay amount is output onto the address bus 16. The operation of the circuit to add twice the delay amount makes use of adders 42 and 44. Adder 44 then outputs the line count plus twice the delay amount through multiplexer 40 and multiplexer 38. This line number is used when writing the red (or blue) data "ahead" in the SRAM.

It is preferable to use a line counter 32 and adders 42 and 44 performing Modulo 2 arithmetic. Thus, for example, if the delay register stores a value of eight and the maximum line delay is thirty-two, then if the line counter has a value of twenty-eight, the Mod 2 output would wrap itself around to output a line number of four.

The generation of the read strobes for the SRAM occur three times in each pixel cycle, i.e. once for each color. If, for example, one is delaying the red and green channels, then the read strobe generated for the blue cycle will be ignored. Conversely, if the blue and green channels are delayed, then the read strobe for the red cycle is ignored.

The generation of the write strobes occurs twice per pixel cycle, at the appropriate times. If one is delaying the red and green channels, the previously delayed red data is read and the present red data is written at:

line number=line count+2 ·the delay.

The previously delayed green data is read and the present green data is written at:

line number =line count+the delay.

Figure 5:
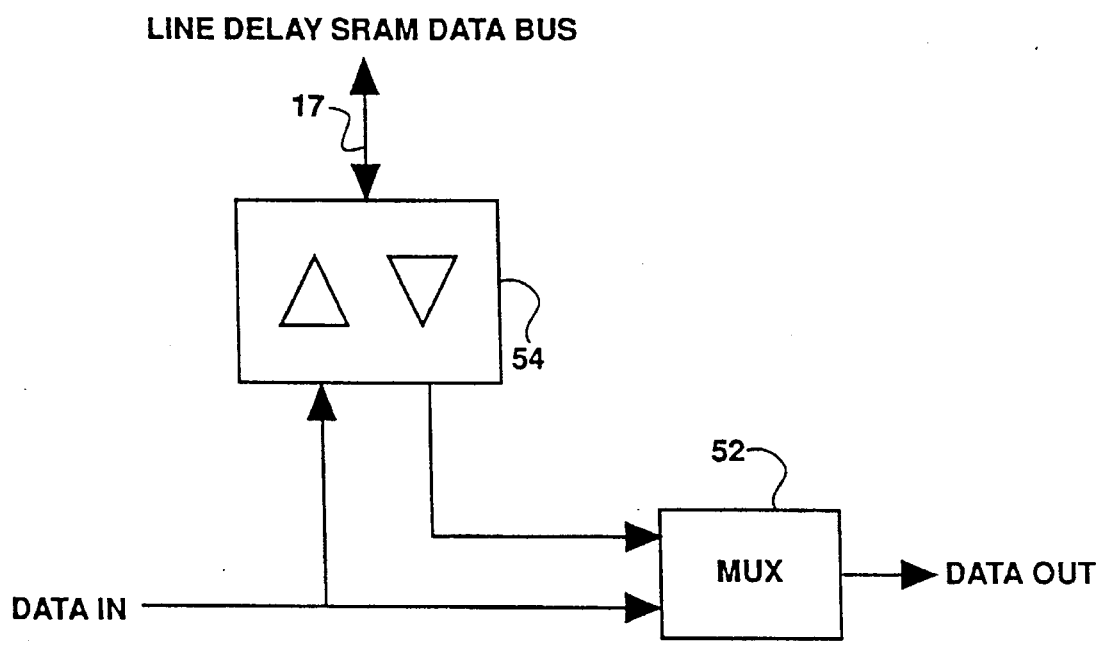
FIG. 5 is a schematic block diagram of the line delay data bus.

FIG. 5 illustrates a block diagram of the SRAM data bus 17. The DATA IN is fed to bi-directional buffers 54 as well as to multiplexer 52 which provides the DATA OUT. The bi-directional buffers 54 are also coupled to the multiplexer 52 as well as to the line delay SRAM data bus 17. The main data path is coupled straight through the multiplexer 52. When writing data to be delayed, and reading data which has been delayed, the bi-directional buffers 54 are used to steer the data from and back into the main data path.

The present invention therefore provides a digital line memory and control circuit which corrects for color channel spatial delay in the digital image of an object such as a document or film scanned when using a tri-linear CCD detector. The circuit corrects for color channel spatial delay when scanned in either direction. The circuit also corrects the spatial delays when scanning at various discrete spatial resolutions in either direction.

As a result of the circuit, the throughput of a scanner is significantly improved. Also, flexible preview/scan operations are made possible. Because the design is digital, it is inherently more robust than previous CCD analog line-delay methods. The spatial realignment of the data simplifies subsequent real-time color processing.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. For use with an imaging device for scanning an image-containing medium, said imaging device having a first linear array of photosensors which are operative to sense a first attribute of an image, and a second linear array of photosensors which are arranged parallel to and are spaced apart from said first linear array by a spatial separation distance therebetween and are operative to sense a second attribute of an image, each of said first and second linear arrays of photosensors extending in a direction that is transverse to a direction of relative translation between said image-containing medium and said imaging device, so that at a given spatial positioning of said image-containing medium and said imaging device, a prescribed region of said image-containing medium is imaged onto one of said first and second linear arrays of photosensors, and subsequently, in the course of relative translation between said image-containing medium and said imaging device imaged, said prescribed region of said image-containing medium is imaged onto the other of said first and second linear arrays of photosensors, and wherein image signals output by said first and second linear arrays are digitized and processed to form a composite digital image, a method of controlling the operation of said imaging device comprising the steps of:

(a) providing a programmable delay mechanism which is operative to delay image signals output by a selected linear array of photosensors by a programmable amount of delay; and (b) in response to a first direction of relative translation between said image-containing medium and said imaging device causing said first array to sense said prescribed region of said image-containing medium prior to said second array sensing said prescribed region of said image-containing medium, causing image signals output by said first linear array to be delayed by said delay mechanism, but in response to a second direction of relative translation between said image-containing medium and said imaging device causing said second array to sense said prescribed region of said image-containing medium prior to said first array sensing said prescribed region of said image-containing medium, causing image signals output by said second linear array to be delayed by said delay mechanism.

2. A method according to claim 1, wherein said first attribute of an image corresponds to a first color of said image and said second attribute of an image corresponds to a second color of said image.

3. A method according to claim 1, wherein said programmable delay mechanism comprises a write/read address signal generator, which is operative to controllably generate write and read address signals, through which digital data representative of image signals output by first and second linear arrays are stored in and accessed from a digital memory, and wherein step (b) comprises causing said write/read address signal generator to controllably generate said write and read address signals that effectively correct for said spatial separation between said first and second linear arrays, in dependence upon whether the direction of relative translation between said image-containing medium and said imaging device is said first direction or said second direction.

4. A method according to claim 3, wherein each of said first and second linear arrays comprises a linear array of pixels, and wherein step (b) comprises causing said write/read address signal generator to controllably generate said write and read address signals in accordance with spatial separations between pixels of a respective linear array.

5. A method according to claim 4, wherein step (b) comprises causing write/read address signal generator to controllably vary said write and read address signals.

6. An imaging device for scanning an image-containing medium, comprising:

a first linear array of photosensors which are operative to sense a first attribute of an image;

a second linear array of photosensors which are operative to sense a second attribute of an image and are arranged parallel to and are spaced apart from said first linear array of photosensors by a spatial separation distance therebetween; and wherein each of said first and second linear arrays of photosensors extends in a direction that is transverse to a direction of relative translation between said image-containing medium and said imaging device, so that at a given spatial positioning of said image-containing medium and said imaging device, a prescribed region of said image-containing medium is imaged onto one of said first and second linear arrays of photosensors, and subsequently, in the course of relative translation between said image-containing medium and said imaging device imaged, said prescribed region of said image-containing medium is imaged onto the other of said first and second linear arrays of photosensors;

an image signal processor which is operative to digitize image signals output by said first and second linear arrays and to produce a composite digital image therefrom; and a programmable delay mechanism which, in response to a first direction of relative translation between said image-containing medium and said imaging device, so that said first array senses said prescribed region of said image-containing medium prior to said second array sensing said prescribed region of said image-containing medium, is operative to cause image signals output by said first linear array to be delayed, but, in response to a second direction of relative translation between said image-containing medium and said imaging device, so that said second array senses said prescribed region of said image-containing medium prior to said first array sensing said prescribed region of said image-containing medium, is operative to cause image signals output by said second linear array to be delayed.

7. An imaging device according to claim 6, wherein said first attribute of an image corresponds to a first color of said image and said second attribute of an image corresponds to a second color of said image.

8. An imaging device according to claim 6, wherein said programmable delay mechanism comprises a write/read address signal generator, which is operative to controllably generate write and read address signals, through which digital data representative of image signals output by first and second linear arrays are stored in and accessed from a digital memory, so as to effectively correct for said spatial separation between said first and second linear arrays, in dependence upon whether the direction of relative translation between said image-containing medium and said imaging device is said first direction or said second direction.

9. An imaging device according to claim 8, wherein each of said first and second linear arrays comprises a linear array of pixels, and wherein said write/read address signal generator is operative to controllably generate said write and read address signals in accordance with spatial separations between pixels of a respective linear array.

10. An imaging device according to claim 9, wherein said write/read address signal generator is operative to controllably vary said write and read address signals.

11. An imaging device according to claim 10, wherein said first attribute of an image corresponds to a first color of said image and said second attribute of an image corresponds to a second color of said image, and wherein said write/read address signal generator comprises a pixel counter which provides a pixel number as a first portion of an address signal to said digital memory, a line number circuit which provides one of a current line number and a delayed line number as a second portion of said address signal to said digital memory, and a color select signal associated with one of said first and second colors, which provides a third portion of said address signal.

12. An imaging device according to claim 11, wherein said line number circuit comprises a line counter which provides a current line number output, a delay register which provides a delay amount output, a first adder which is coupled to receive said current line output and said delay amount and provides a first delayed line number output, a second adder which is coupled to receive said first delayed line number output and said delay amount and provides a second delayed line number output, a first multiplexer which is coupled to receive said first and second delayed line number outputs and provides a first multiplexer output, and a second multiplexer which is coupled to receive said current line number output and said first multiplexer output and provides said one of a current line number and a delayed line number as said second portion of said address signal.

* * * * *